United States Patent
Maeda

(10) Patent No.: US 8,538,231 B2
(45) Date of Patent: Sep. 17, 2013

(54) AUDIOVISUAL RECORDING APPARATUS

(75) Inventor: Masamine Maeda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 899 days.

(21) Appl. No.: 12/138,228

(22) Filed: Jun. 12, 2008

(65) Prior Publication Data

US 2008/0310821 A1  Dec. 18, 2008

(30) Foreign Application Priority Data

Jun. 14, 2007  (JP) ................. 2007-157613

(51) Int. Cl.
*H04N 5/91*  (2006.01)
(52) U.S. Cl.
USPC ............ 386/96; 386/248; 386/224; 386/231; 386/E5.002
(58) Field of Classification Search
USPC ............. 386/96, 248, 224, 231, E5.002
See application file for complete search history.

(56) References Cited

U.S. PATENT DOCUMENTS

| | | | |
|---|---|---|---|
| 6,289,102 B1 * | 9/2001 | Ueda et al. | 380/201 |
| 6,687,802 B1 * | 2/2004 | Kori et al. | 711/163 |
| 7,096,268 B1 * | 8/2006 | Shoda et al. | 709/229 |
| 7,307,935 B2 * | 12/2007 | Kusano et al. | 369/53.31 |
| 2002/0078037 A1 * | 6/2002 | Hatanaka et al. | 707/3 |
| 2002/0164156 A1 * | 11/2002 | Bilbrey | 386/112 |
| 2004/0246534 A1 | 12/2004 | Higuchi et al. | |

* cited by examiner

*Primary Examiner* — Jeffrey Pwu
*Assistant Examiner* — Helai Salehi
(74) *Attorney, Agent, or Firm* — Canon USA Inc. IP Division

(57) ABSTRACT

In response to an instruction to duplicate audio-video data recorded on a recording medium, duplication history information and unduplicated audio-video data that is indicated by the duplication history information are transmitted. Upon receipt of an instruction to generate duplication history information, an apparatus configured to record onto the recording medium, duplication history information indicating that the transmitted audio-video data has been duplicated, generates history information indicating that the audio-video data recorded on the recording medium has been duplicated.

7 Claims, 7 Drawing Sheets

```
<backup>
Item = M0001
Item = M0002
Item = M0003
```

```
<backup>
Item = M0001
Item = M0002
Item = M0003
Item = M0004
Item = M0005
Item = M0006
Item = M0007
```

PAUSE
0:15:39

```
<backup>
Item = M0001
Item = M0002
Item = M0003
Item = M0004 *
Item = M0005 *
Item = M0006 *
Item = M0007 *
```

FIG. 9

```
<backup>
Item = M0001
Item = M0002
Item = M0003
Item = M0008
Item = M0009
Item = M0010
```

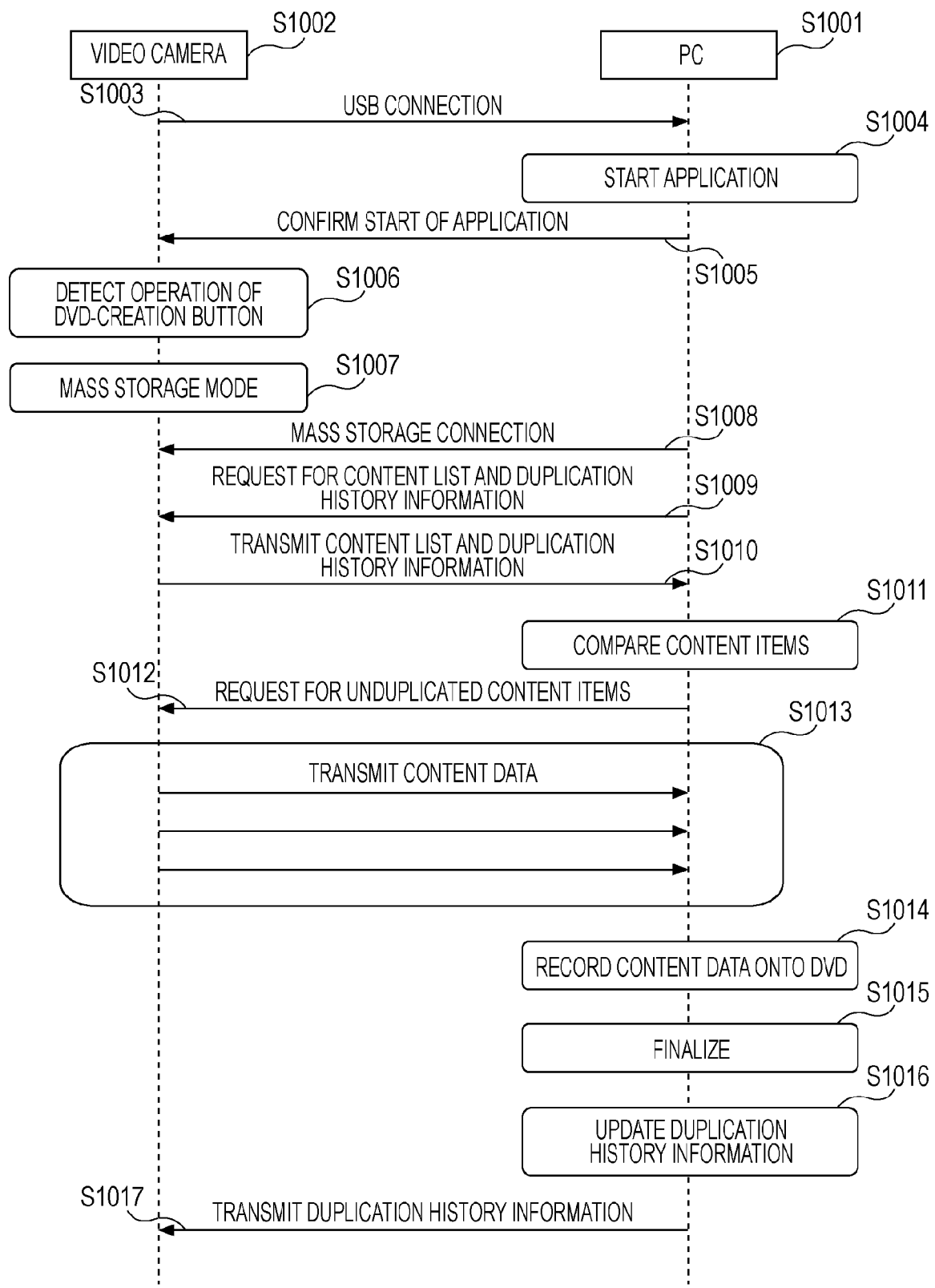

AUDIOVISUAL RECORDING APPARATUS

BACKGROUND OF THE INVENTION

1. Field of the Invention

The present invention relates to a recording apparatus and, more specifically, an audiovisual recording apparatus.

2. Description of the Related Art

Hard disk drive (HDD) recorders configured to receive television broadcasts and to record them onto HDDs have been available. Recently, video cameras equipped with HDDs have also been available.

In such HDD recorders or HDD-equipped video cameras, HDDs are used to temporarily record audio-video data such as audio-video data of recorded television broadcasts or captured audio-video data. Audio-video data temporarily recorded on HDDs is usually duplicated and recorded onto digital versatile disks (DVDs) by users using personal computers (PCs), built-in DVD drives, or the like.

For example, U.S. Patent Laid-Open No. 2004/0246534 discloses a video camera capable of duplicating audio-video data to a DVD by a single touch operation in cooperation with an application operating on a PC.

When recording audio-video data recorded in the manner described above onto external media, users search on PCs for a desired audio-video data file from a large number of audio-video data files and enter an instruction to record it.

SUMMARY OF THE INVENTION

The present invention provides an apparatus capable of duplicating a desired audio-video data file without performing complex operations.

According to one aspect of the present invention, a recording apparatus capable of recording audio-video items includes an access unit configured to access a recording medium having recorded thereon at least one audio-video data file and history information indicating whether the at least one audio-video data file is a duplicated file, a communication unit configured to communicate with an external apparatus, wherein the external apparatus is configured to duplicate the at least one audio-video data file, an instruction unit configured to instruct duplication of the at least one audio-video data file recorded on the recording medium, a control unit configured to, according to an instruction of the instruction unit, control the communication unit to transmit the history information and an unduplicated audio-video data file of the at least one audio-video data file indicated by the history information to the external apparatus and to control the access unit so that history information indicating that the transmitted at least one audio-video data file becomes a duplicated file on the recording medium, and a history generation instructing unit configured to instruct generation of the history information indicating that the transmitted at least one audio-video data file becomes a duplicated file, wherein the control unit generates, according to the instruction of the history generation instruction unit, history information indicating that the at least one audio-video data file that has been recorded on the recording medium when the history generation instructing unit indicates the at least one audio-video date file is a duplicated file.

According to the present invention, at least one audio-video data file can be easily duplicated (temporarily) after an instruction is received from a user.

Further features and aspects of the present invention will become apparent from the following detailed description of exemplary embodiments with reference to the attached drawings.

BRIEF DESCRIPTION OF THE DRAWINGS

FIG. 8 is a diagram showing an example of duplication history information obtained by the video camera of the embodiment.

FIG. 9 is a diagram showing an example of duplication history information obtained by the video camera of the embodiment.

FIG. 10 is a sequence diagram showing a duplication operation according to an embodiment of the present invention.

DESCRIPTION OF THE EMBODIMENTS

First Embodiment

Figure 1:
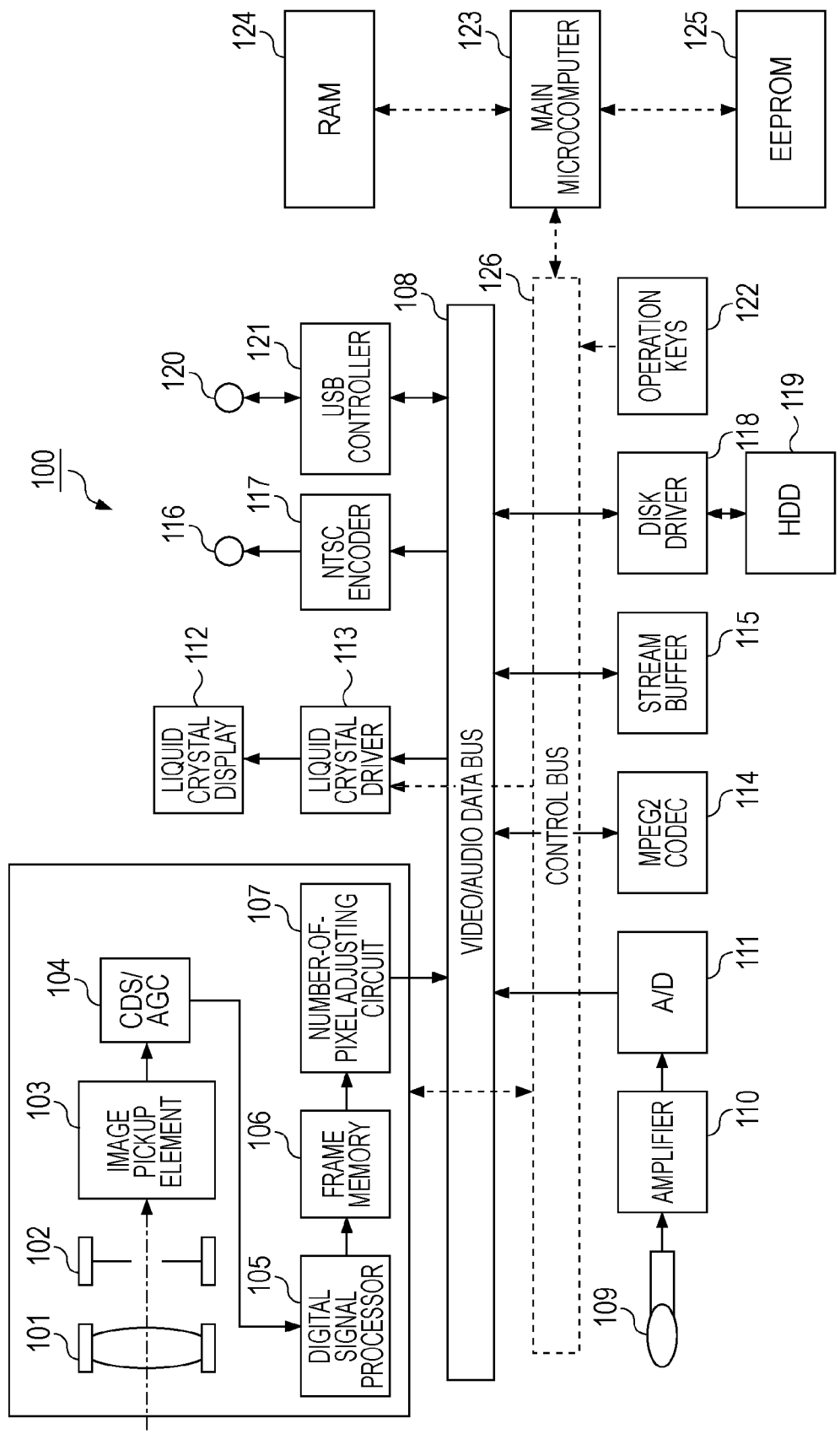
FIG. 1 is a block diagram of a video camera according to an embodiment of the present invention.

FIG. 1 is a block diagram of a video camera 100 according to a first embodiment of the present invention.

Referring to FIG. 1, a photographing lens 101 captures an image. An aperture stop 102 controls the amount of light entering an image pickup element 103. The image pickup element 103 converts the image captured through the photographing lens 101 into an electrical signal. A correlated double sampling/automatic gain controller (CDS/AGC) 104 samples and holds an image signal obtained from the image pickup element 103 to adjust the image signal to a desired signal level. A digital signal processing circuit 105 converts the image signal obtained from the CDS/AGC 104 into digital data. A frame memory 106 stores the image data obtained from the digital signal processing circuit 105 on a frame-by-frame basis. A number-of-pixel adjusting circuit 107 appropriately adjusts the number of pixels of image data stored in the frame memory 106 so that the image data can be recorded using MPEG2 (Moving Picture Experts Group-2) compression described below.

A video/audio data bus 108 is a data bus through which the image data and audio data, described below, are exchanged between blocks.

A microphone 109 captures sound. An amplifier 110 amplifies an audio signal supplied from the microphone 109 to a desired level. An analog-to-digital (A/D) converter 111 converts the amplified audio signal into digital data.

A liquid crystal display 112 displays, in a reproduction mode, reproduced image data supplied from an MPEG2 codec 114, and displays, in a shooting mode, image data captured using the image pickup element 103. A liquid crystal driver 113 drives the liquid crystal display 112.

The MPEG2 codec 114 encodes image data transmitted from an image-capturing unit via the video/audio data bus 108 according to the MPEG2 standard to compress the amount of information of the image data. The MPEG2 codec 114 also expands MPEG2-compressed audio-video data, which is recorded on an HDD 119, to decode information of the audio-video data. A stream buffer 115 temporarily records and holds compressed moving-image data supplied from the MPEG2 codec 114 before it is recorded on the HDD 119. The MPEG2 codec 114 is merely an example, and any other codec capable of compressing (encoding) and expanding (decoding) image data may be used.

A video output terminal 116 is an output terminal from which image data supplied from an NTSC (National Television Standards Committee) encoder 117 is output. The NTSC encoder 117 converts image data into an analog signal, and outputs the analog signal to the video output terminal 116.

A disk driver 118 performs control to read and write data from and to the HDD 119. The HDD 119 has recorded thereon audio-video data including image data and audio data, which are sent through the video/audio data bus 108.

A universal serial bus (USB) terminal 120 communicates with an external device such as a PC and transmits or receives data recorded on the HDD 119, such as MPEG2-compressed audio-video data, to or from the external device. A USB controller 121 controls transmission and reception of data between the USB terminal 120 and an external device connected to the USB terminal 120.

Operation keys 122 are used to perform various operations of the video camera 100. The operation keys 122 receive an instruction from a user, and transmit an instruction signal to a main microcomputer 123.

The main microcomputer 123 controls modes of operation of the video camera 100, or detects an instruction signal transmitted from the operation keys 122 to control execution of various functions. A random access memory (RAM) 124 is used by the main microcomputer 123 to store temporary data. An electrically erasable programmable read-only memory (EEPROM) 125 is a non-volatile memory configured to store a certain state of the main microcomputer 123. A control bus 126 is a signal bus through which a control signal is sent from the main microcomputer 123 or through which an instruction signal is sent from the operation keys 122.

First, a basic recording operation of the video camera 100 shown in FIG. 1 will be described.

Light incident from an object through the photographing lens 101 reaches the aperture stop 102 to control the amount of light, and is converted into an electrical signal by the image pickup element 103. The electrical signal is adjusted to a desired signal level by the CDS/AGC 104, and is converted into digital data by the digital signal processing circuit 105. The image data obtained from the digital signal processing circuit 105 is stored in the frame memory 106 on a frame-by-frame basis. A timing signal for extracting data from the image pickup element 103 is generated by the main microcomputer 123. The image data stored in the frame memory 106 is adjusted to a desired number of pixels by the number-of-pixel adjusting circuit 107, and is encoded by the MPEG2 codec 114 using MPEG2 compression.

An audio signal captured by the microphone 109 is amplified by the amplifier 110, and is converted into digital data by the A/D converter 111.

The MPEG2 codec 114 multiplexes the encoded image data and audio data with predetermined control information to form an MPEG2 program stream or transport stream. The control information is additional photographic information including information regarding the video camera 100, setting information for recording an image, sound, and environmental photographic information.

The main microcomputer 123 writes data streams of image data and audio data onto the HDD 119, as audio-video data, under management of a file system such as a universal disk format (UDF) or file allocation table (FAT) file system. The file system means a structure system including management information used to manage files and file data. Sharing the file system allows recording and reproduction using different storage media or recording/reproducing apparatuses.

The data streams are transmitted to the video output terminal 116 as necessary, or are displayed on the liquid crystal display 112 through the liquid crystal driver 113.

In the first embodiment, the HDD 119 is used as a storage medium. However, the storage medium in the first embodiment is not limited to a hard disk, and any other storage medium may be used, for example, a memory card such as a multi-media card (MMC), a smart media card (SSFDC), a security digital (SD) card, a CompactFlash® (CF) card, or a PC card, or a magnetic (or magneto-optical) recording medium such as a compact disk rewritable (CD-RW), a flexible disk (FD), a mini-disk (MD), or a DVD-RAM.

A normal reproduction operation of the video camera 100 shown in FIG. 1 will be described.

In response to an instruction from the operation keys 122, the main microcomputer 123 reads audio-video data recorded on the HDD 119, and transmits it to the MPEG2 codec 114. The MPEG2 codec 114 separates the audio-video data into image data, audio data, and control information. The audio data is output from speakers or the like through an audio processing circuit (not shown). The image data is expanded and demodulated by the MPEG2 codec 114. The main microcomputer 123 controls the liquid crystal driver 113 to display the demodulated image data on the liquid crystal display 112. Alternatively, the demodulated image data is transmitted to the video output terminal 116 through the NTSC encoder 117.

The video camera 100 of the first embodiment is connected to an external device such as a PC so that audio-video data recorded on the HDD 119 can be recorded onto an external medium such as a DVD. In the first embodiment, duplication history information is also recorded on the HDD 119. The duplication history information indicates which audio-video data file among the audio-video data files recorded on the HDD 119 is a duplicated item. In the first embodiment, the duplication history information is created and recorded onto the HDD 119 by an application operating on the PC or the like during a duplication operation described below. Alternatively, the duplication history information may be created and recorded onto the HDD 119 by the main microcomputer 123 when the video camera 100 is initialized or during a delimiting operation for modifying duplication history information, which is described below. Alternatively, the duplication history information may be recorded on the HDD 119 at the time of shipment of the product.

The video camera 100 transmits the duplication history information to an application of an external device such as a PC to thereby record unduplicated audio-video data onto an external medium such as a DVD. The duplication history information is not necessarily recorded on the HDD 119 but may be recorded on another medium such as an SD card, a CF card, or an internal memory.

Figure 2:
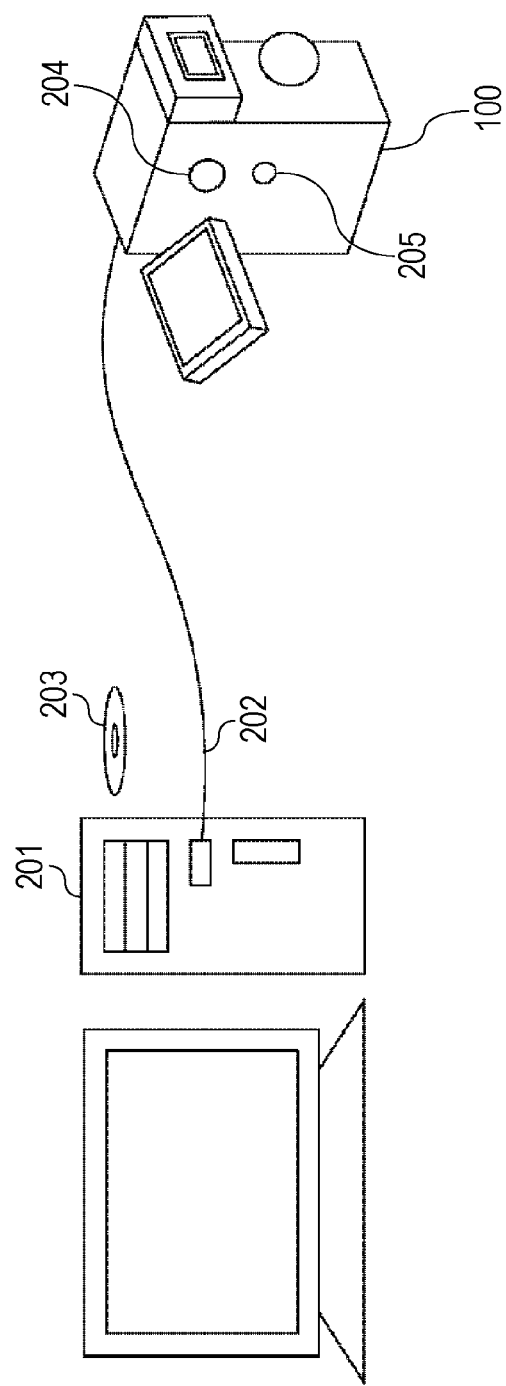
FIG. 2 is a diagram showing a connection established between the video camera of the embodiment and a PC.

FIG. 2 shows a connection established between a PC 201 and the video camera 100. Referring to FIG. 2, the PC 201 is a PC having a built-in DVD drive, and is used to record audio-video data recorded on the HDD 119 of the video camera 100 onto a DVD. The PC 201 is an example of an information processing apparatus. The information processing apparatus is configured to perform various types of information processing by installing therein a program executable on the information processing apparatus.

The PC 201 and the video camera 100 are connected via a USB cable 202. Audio-video data transmitted from the HDD 119 of the video camera 100 to the PC 201 is recorded onto a DVD 203. A DVD-creation key 204 is one of the operation keys 122 shown in FIG. 1, and a user enters a duplication instruction using the DVD-creation key 204. A duplication-history-information generation key 205 is one of the operation keys 122 shown in FIG. 1.

When the DVD-creation key 204 is operated and a connection is established between the video camera 100 and the PC 201, an application for duplicating data to the DVD 203 is started on the PC 201. The application is configured to acquire audio-video data from the HDD 119 and to record it onto the DVD 203.

Details of a duplication operation according to the first embodiment will be described with reference to FIG. 3.

Figure 3:
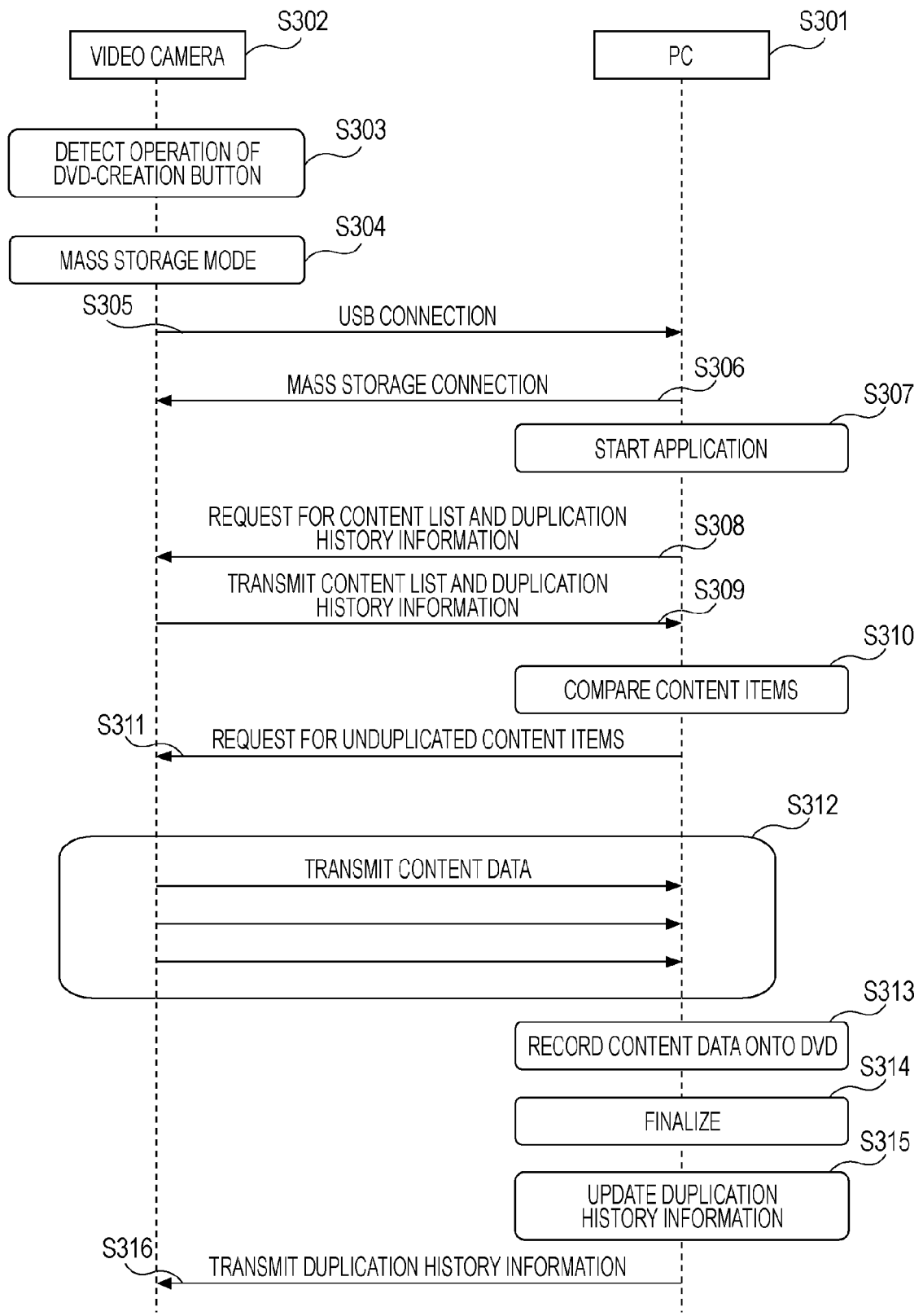
FIG. 3 is a sequence diagram showing a duplication operation according to the embodiment.

FIG. 3 is a sequence diagram showing a duplication operation for performing duplication by establishing a connection between the PC 201 and the video camera 100 according to the first embodiment. In FIG. 3, the PC 201 starts a process in step S301, and the video camera 100 starts a process in step S302.

First, the DVD-creation key 204 of the video camera 100 is operated to issue a duplication instruction. Then, the main microcomputer 123 detects an instruction signal from the DVD-creation key 204 (step S303), and sets the video camera 100 to a mass storage mode (step S304). In this state, the user establishes a connection between the PC 201 and the video camera 100 via the USB cable 202 (step S305), thereby connecting the HDD 119 of the video camera 100 to the PC 201 according to the mass storage class (step S306). Thus, the main microcomputer 123 of the video camera 100 serves as a controller of the HDD 119. If a USB connection is not established, the mass storage mode may be canceled after the elapse of a certain period of time and the video camera 100 may be returned to a normal shooting mode or a reproduction mode, or the video camera 100 may be powered off.

After the connection is established, the PC 201 starts an application for duplication to a DVD (step S307).

The application then requests that the video camera 100 provide a content list indicating a list of audio-video data files recorded on the HDD 119 and the duplication history information described above (step S308). The main microcomputer 123 of the video camera 100 transmits the content list and the duplication history information to the PC 201 according to the request (step S309).

The application operating on the PC 201 compares the acquired content list with the duplication history information (step S310) to specify unduplicated audio-video data files. In a case where the HDD 119 has no duplication history information recorded thereon, the application does not acquire duplication history information, and determines that all the audio-video data files recorded on the HDD 119 are unduplicated files.

The application selects the audio-video data files specified in the procedure described above, and requests that the video camera 100 provide the audio-video data files recorded on the HDD 119 in order starting from that having the oldest recording date (step S311). The main microcomputer 123 transmits the audio-video data files recorded on the HDD 119 to the PC 201 according to the request (step S312).

The application operating on the PC 201 sequentially records the acquired audio-video data files onto the DVD 203 (step S313). When the DVD 203 runs out of space so that no additional audio-video data files may be written thereon or when the recording of all the unduplicated audio-video data files is completed, the application finalizes the DVD 203 (step S314). When the DVD 203 runs out of space, the application displays on a display of the PC 201 a message that prompts the user to place a further DVD 203 in the PC 201 after the current DVD 203 has been finalized. Alternatively, the main microcomputer 123 of the video camera 100 may display the message on the liquid crystal display 112 in response to an instruction from the PC 201. When the further DVD 203 is placed, the application again sequentially records the acquired audio-video data files onto the further DVD 203 (step S313).

Accordingly, the series of steps for duplication onto a DVD is completed.

After the operation of duplication onto a DVD is completed, the application operating on the PC 201 updates the duplication history information concerning the current duplicated audio-video data files (step S315). The application transmits the updated duplication history information to the HDD 119 of the video camera 100 (step S316). The main microcomputer 123 overwrites the duplication history information recorded on the HDD 119 with the updated duplication history information.

As an alternative, the application operating on the PC 201 may directly instruct the main microcomputer 123 so that the duplication history information recorded on the HDD 119 is directly updated by the main microcomputer 123.

Figure 4:
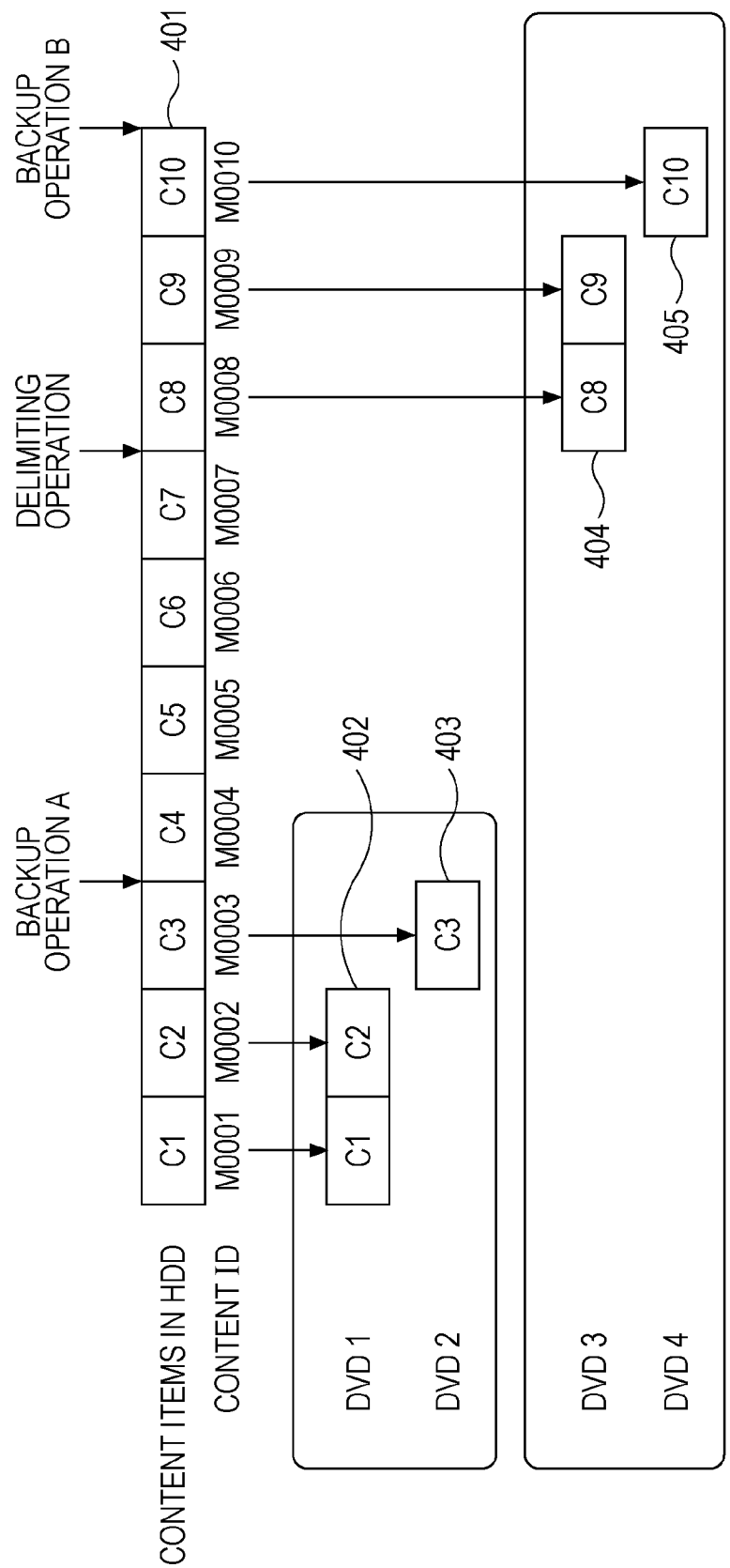
FIG. 4 is a diagram showing an example of a DVD created by the duplication operation according to the embodiment.

FIG. 4 shows DVDs 1 and 2, which are examples of DVDs created by the sequence shown in FIG. 3.

Referring to FIG. 4, an audio-video data list 401 is a list of audio-video data files recorded on the HDD 119, which are arranged in chronological order of recording. In the first embodiment, content IDs are assigned to audio-video data files in order of recording, in which a sequence of moving-image/audio data, which is recorded on the HDD 119 for a period from when a user enters an instruction to start recording to when the user enters an instruction to stop recording, is managed as one file (content). For example, in a state where the video camera 100 is connected to the PC 201, when the DVD-creation key 204 is pressed after the capturing of content items C1 to C3 (with IDs of M0001 to M0003) is completed, the duplication operation described above is executed. According to the operation described above, since duplication history information has not yet been recorded on the HDD 119 of the video camera 100, audio-video data files corresponding to the content items C1 to C3 (with IDs of M0001 to M0003) are regarded as unduplicated files, and are therefore to be duplicated.

When audio-video data files 402 corresponding to the content items C1 and C2 (with IDs of M0001 and M0002) are duplicated, a first DVD runs out of space. An audio-video data file 403 corresponding to the content item C3 (with an ID of M0003) is duplicated to a second DVD. Then, the duplication operation is completed.

Figures 5, 6, 7:
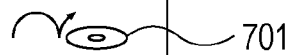
FIG. 5 is a diagram showing an example of duplication history information obtained by the video camera of the embodiment.
FIG. 6 is a diagram showing an example of duplication history information obtained by the video camera of the embodiment.
FIG. 7 is a diagram showing an example of a skip mark used in the video camera of the embodiment.

After the duplication operation is completed, the application operating on the PC 201 creates duplication history information, and transmits it to the HDD 119 for recording. FIG. 5 shows the duplication history information created by the application. The duplication history information shown in FIG. 5 indicates that content items with IDs of M0001 to M0003 have been registered as duplicated content items. This means that the audio-video data files corresponding to the content items C1 to C3 are duplicated files.

Thereafter, when the user has completed capturing of content items up to a content item C7, the user desires to preferentially duplicate content items that have not yet been captured onto a DVD. An operation of such preferential duplication will be described. That is, an operation of preferentially duplicating audio-video data files corresponding to content items subsequent to the content item C7 onto a DVD before the audio-video data files corresponding to the content items C4 to C7 will be described.

In order to capture a content item C8, the user operates the operation keys 122 to set the video camera 100 to the shooting mode. In the shooting mode, if the duplication-history-information generation key 205 of the video camera 100 is operated in a state where the video camera 100 is not connected to the PC 201, the main microcomputer 123 modifies the duplication history information recorded on the HDD 119 to that shown in FIG. 6. This operation is hereinafter referred to as a "delimiting operation". The duplication history information shown in FIG. 6 modified by the delimiting operation indicates that content items with IDs of M0001 to M0007 have been registered as duplicated content items.

In other words, in response to a delimiting operation, the main microcomputer 123 modifies the duplication history information so that all content items that have been captured before the delimiting operation are regarded as duplicated content items.

When a delimiting operation is performed, as shown in FIG. 7, the main microcomputer 123 causes a skip mark 701 indicating that a delimiting operation was executed to be displayed on the liquid crystal display 112 in the shooting mode. This indication is continuously displayed, regardless of the recording mode or the reproduction mode, until the start or end of a next duplication operation. Instead of using the skip mark 701, a light-emitting diode (LED) lamp (not shown) may be turned on to notify the user that a delimiting operation was executed.

This allows the user to understand that the video being currently captured is preferentially duplicated. Further, in the reproduction mode, for example, thumbnails may be marked in a thumbnail screen so that the user can distinguish between content items to be duplicated and content items not to be duplicated.

Further, when the duplication-history-information generation key 205 is pressed while the skip mark 701 is being displayed, the main microcomputer 123 cancels the modification of the duplication history information. That is, the duplication history information shown in FIG. 6 is returned to that shown in FIG. 5, and indicates again that only the audio-video data files corresponding to the content items C1 to C3 are duplicated files.

After the delimiting operation is performed, as shown in FIG. 4, the capturing of content items up to a content item 10 is completed, and then a second duplication operation is executed. An operation in this case will be described with reference to FIGS. 3 and 4.

The processing of steps S301 to S307 shown in FIG. 3 is similar that described above, and a description thereof is thus omitted. In step S307, an application is started on the PC 201. The application requests that the video camera 100 provide a content list and the modified duplication history information described above (step S308). The main microcomputer 123 of the video camera 100 transmits the content list and the modified duplication history information to the PC 201 according to the request (step S309).

Then, the application operating on the PC 201 compares the acquired content list with the duplication history information (step S310) to specify unduplicated audio-video data files.

Since the duplication history information shown in FIG. 6 is recorded on the HDD 119, the application can acquire the duplication history information.

The application operating on the PC 201 compares the duplication history information with the content list acquired from the HDD 119 (step S310), and determines that audio-video data files corresponding to the content items C8 to C10 are unduplicated files. Thus, the audio-video data files corresponding to the content items C8 to C10 are regarded as data files to be duplicated.

As shown in FIG. 4, when audio-video data files 404 corresponding to the content items C8 and C9 (with IDs of M0008 and M0009) are duplicated, a first DVD runs out of space. An audio-video data file 405 corresponding to the content item C10 (with an ID of M0010) is duplicated to a second DVD. Then, the duplication operation is completed.

The application operating on the PC 201 creates duplication history information indicating the audio-video data files corresponding to the content items C8 to C10 are duplicated content data files, and transmits the duplication history information to the HDD 119.

The operation described above allows the audio-video data files corresponding to the content items C8 to C10 to be preferentially duplicated before the audio-video data files corresponding to the content items C4 to C7.

In addition to the structure described above, duplication history information may be generated so as to indicate that a content item that was regarded as a duplicated content item by a delimiting operation is not a duplicated content item after the completion of the duplication operation, and may be transmitted. That is, after the audio-video data files corresponding to the content items C8 to C10 are transmitted, duplication history information indicating that the audio-video data files corresponding to the content items C4 to C7, which have not been duplicated, are identified as unduplicated content data files is transmitted to the HDD 119.

Specifically, as shown in FIG. 8, the main microcomputer 123 adds to a content item an identification flag for identifying a content item that is regarded as a duplicated content item by a delimiting operation. In FIG. 8, the identification flag is added to the content items C4 to C7, which are unduplicated items.

After the completion of the duplication operation, as shown in FIG. 9, the application operating on the PC 201 creates duplication history information that does not include the content IDs marked with the identification flag. The duplication history information shown in FIG. 9 indicates only the content items C1 to C3 and C8 to C10, which are actually duplicated items.

With this structure, the audio-video data files corresponding to the content items C4 to C7, which are unduplicated files, can be duplicated later.

In addition, besides duplication history information indicating duplicated content items, a separate file indicating content items that are regarded as duplicated items may be created by the main microcomputer 123 when the DVD-creation key 204 is pressed.

Further, duplication history information may be information capable of identifying a duplicated content item, and is not limited to the duplication history information of the first embodiment.

Second Embodiment

In the first embodiment, the HDD 119 of the video camera 100 is identified as a drive of the PC 201, and audio-video data recorded on the HDD 119 is duplicated by using an application executable on the PC 201. However, the present invention is not limited to this embodiment, and the video camera 100 and a dedicated DVD writer or the like may be used to perform duplication.

In this case, specifically, the DVD-creation key 204 of the video camera 100 is operated in a state where the video camera 100 is connected to a dedicated DVD writer. Thereby the main microcomputer 123 instructs the dedicated DVD writer to start a duplication operation.

When a duplication operation is started, the main microcomputer 123 compares duplication history information with a content list recorded on the HDD 119 to specify unduplicated content items. Then, audio-video data files corresponding to the specified unduplicated content items are read from the HDD 119 and are transmitted to the dedicated DVD writer.

The dedicated DVD writer is operated by a built-in microcomputer, and sequentially records the audio-video data files transmitted from the video camera 100 onto a DVD. When the recording onto a DVD is completed, the microcomputer of the DVD writer notifies the video camera 100 of the completion of the recording.

The main microcomputer 123 of the video camera 100 confirms that all the unduplicated audio-video data files have been transferred and that a notification of the completion of the recording has been received from the DVD writer. After the confirmation, the main microcomputer 123 updates the duplication history information so that the current duplicated content items are duplicated content items. The method of modifying and updating duplication history information is similar to that of the first embodiment, and a description thereof is thus omitted.

Third Embodiment

A video camera equipped with an HDD and a DVD drive can duplicate data to a DVD without using the dedicated DVD writer described in the second embodiment. In this case, as in the first embodiment, in the video camera 100, a DVD-creation key 204 and a duplication-history-information generation key 205 are separately provided. Specifically, when the DVD-creation key 204 is operated to issue a duplication instruction, the main microcomputer 123 sets the video camera 100 to a duplication mode.

When a duplication operation is started, the main microcomputer 123 compares duplication history information with a content list recorded on the HDD 119 to specify unduplicated content items. Then, the main microcomputer 123 controls the DVD drive to sequentially record audio-video data files corresponding to the unduplicated content items onto a DVD.

When the main microcomputer 123 confirms that all the audio-video data files have been recorded onto a DVD, the main microcomputer 123 updates the duplication history information so that the current duplicated content items are duplicated content items. The method of modifying and updating duplication history information is similar to that of the first embodiment, and a description thereof is thus omitted.

Fourth Embodiment

In the first embodiment, the DVD-creation key 204 and the duplication-history-information generation key 205 are separate switches. Those two keys may be integrated. In a fourth embodiment of the present invention, the integrated key will be described as a DVD-creation key 204'. In the fourth embodiment, the DVD-creation key 204' operates as a key for modifying duplication history information in a state where the video camera 100 is not connected to the PC 201. The fourth embodiment is different from the first embodiment in terms of operation of duplication.

A duplication operation according to the fourth embodiment will be described in detail with reference to FIG. 10.

FIG. 10 is a sequence diagram showing a duplication operation for performing duplication by establishing a connection between the PC 201 and the video camera 100 according to the fourth embodiment. In FIG. 10, the PC 201 starts a process in step S1001, and the video camera 100 starts a process in step S1002.

First, when the PC 201 detects a connection between the PC 201 and the video camera 100 via the USB cable 202 (step S1003), the PC 201 starts an application for writing data onto a DVD (step S1004). After starting the application, the PC 201 notifies the video camera 100 of the completion of the start of the application (step S1005).

After the main microcomputer 123 receives the notification of step S1005, when the DVD-creation key 204' is operated by a user (step S1006), the main microcomputer 123 sets the video camera 100 to a mass storage mode (step S1007).

In this state, the PC 201 identifies the HDD 119 of the video camera 100 as a drive of the PC 201 (step S1008).

When a connection is established in the mass storage mode, the application operating on the PC 201 requests that the HDD 119 provide a content list indicating a list of audio-video data files recorded on the HDD 119 and the duplication history information described above (step S1009). The HDD 119 transmits the content list and the duplication history information to the PC 201 according to the request (step S1010).

The application operating on the PC 201 compares the acquired content list with the duplication history information (step S1011) to specify unduplicated audio-video data files. In a case where the HDD 119 has no duplication history information recorded thereon, the application does not acquire duplication history information, and determines that all the audio-video data files recorded on the HDD 119 are unduplicated files.

The application requests that the HDD 119 provide the audio-video data files specified in the procedure described above, which are recorded on the HDD 119, in order starting from that having the oldest recording date (step S1012). The HDD 119 transmits the requested audio-video data recordings to the PC 201 according to the request (step S1013).

The application operating on the PC 201 sequentially records the acquired audio-video data files onto the DVD 203 (step S1014). When the DVD 203 runs out of space so that no additional audio-video data files may be written thereon or when the recording of all the unduplicated audio-video data files is completed, the application finalizes the DVD 203 (step S1015). When the DVD 203 runs out of space, the application displays on a display of the PC 201 a message that prompts the user to place a further DVD 203 in the PC 201 after the current DVD 203 has been finalized. Alternatively, the main microcomputer 123 of the video camera 100 may display the message on the liquid crystal display 112 in response to an instruction from the PC 201. When the further DVD 203 is placed, the application again sequentially records the acquired audio-video data files onto the further DVD 203 (step S1014).

Accordingly, the series of steps for duplication onto a DVD is completed.

After the operation of duplication onto a DVD is completed, the application operating on the PC 201 updates the acquired duplication history information so as to indicate that the current duplicated audio-video data files are duplicated files (step S1016). The application transmits the updated duplication history information to the HDD 119 of the video camera 100 (step S1017), and the duplication history information recorded on the HDD 119 is overwritten with the updated duplication history information.

The method of modifying and updating duplication history information is similar to that of the first embodiment, except that, as described above, the DVD-creation key 204' operates as a key for modifying duplication history information in a state where the video camera 100 is not connected to the PC 201, and a description thereof is thus omitted.

Fifth Embodiment

As in the fourth embodiment, the DVD-creation key 204 and the duplication-history-information generation key 205 may be integrated, and a video camera equipped with an HDD and a DVD drive may be used to perform duplication to a DVD. In this case, the integrated DVD-creation key 204' may be used as a trigger to perform a duplication operation only when the video camera is set to a DVD-duplication mode by using a switch (not shown). The integrated DVD-creation key 204' operates as a key for modifying duplication history information otherwise. A specific operation of the integrated DVD-creation key 204' is similar to that of the fourth embodiment, and a description thereof is thus omitted.

The present invention may be applied to a system including a plurality of devices (such as a host computer, an interface device, and a video camera).

While a USB interface is used in the foregoing embodiments, wired connection such as an IEEE (Institute of Electrical and Electronics Engineers) 1394 or Ethernet or wireless connection such as IRDA (Infrared Data Association), 802.11x, or Bluetooth may be used.

The advantages of the present invention can also be achieved by executing the following processes. That is, a storage medium having recorded thereon program code of software implementing the functions of the foregoing embodiments is supplied to a system or an apparatus, and a computer (or a central processing unit (CPU) or a microprocessing unit (MPU)) of the system or apparatus reads and executes the program code stored on the storage medium.

In this case, the program code read from the storage medium achieves the functions of the foregoing embodiments. The program code and the storage medium storing the program code may constitute embodiments of the present invention.

Examples of a storage medium for supplying the program code may include a floppy disk, a hard disk, an optical disk, a magneto-optical disk, a compact disk read-only memory (CD-ROM), a CD readable (CD-R) disk, a magnetic tape, a non-volatile memory card, and a ROM.

According to an embodiment of the present invention, the program code read by the computer may be executed to achieve the functions of the foregoing embodiments. In addition, according to other embodiments of the present invention, an operating system (OS) or the like operating on the computer may execute part of or the entirety of actual processing according to the instruction of the program code to achieve the functions of the foregoing embodiments.

In further embodiments of the present invention, the functions of the foregoing embodiments may be achieved by the following processes. The program code read from the storage medium is written in a memory of a function extension board placed in the computer or a function extension unit connected to the computer, and thereafter a CPU or the like of the function extension board or the function extension unit executes part of or the entirety of actual processing according to the instruction of the program code.

The present invention is not limited to the above embodiments and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-157613 filed Jun. 14, 2007, which is hereby incorporated by reference herein in its entirety.

What is claimed is:

1. A recording apparatus capable of recording audio-video data files, comprising:
   an access unit that accesses a recording medium having recorded thereon audio-video data file and history information indicating whether the audio-video data file is duplicated;
   a communication unit that communicates with an external apparatus, wherein the external apparatus is configured to duplicate the audio-video data file;
   an instruction unit that instructs duplication of the audio-video data file recorded on the recording medium;
   a controller, according to an instruction of the instruction unit, controls the communication unit to transmit the history information and an unduplicated audio-video data file, indicated by the history information, to the external apparatus and controls the access unit so that history information indicating that the transmitted audio-video data file is duplicated on the recording medium; and
   a history generation instructing unit that instructs generation of the history information indicating that the transmitted audio-video data file is a duplicated file,
   wherein the controller, according to an instruction of the history generation instructing unit generates history information indicating that the unduplicated audio-video data file of the audio-video data file is duplicated, without transmitting unduplicated audio-video data file of the audio-video data file to the external apparatus,
   wherein the instruction unit and the history generation instructing unit are integrated into a single operation member,
   wherein the single operation member operates as the instruction unit when the single operation member is operated in a state where the recording apparatus is connected to the external apparatus, and
   wherein the single operation member operates as the history generation instructing unit when the single operation member is operated in a state where the recording apparatus is not connected to the external apparatus.

2. The recording apparatus according to claim 1, further comprising
   a notifying unit that provides notification that history information has been generated according to the instruction of the history generation instructing unit.

3. The recording apparatus according to claim 1, wherein the recording medium has further recorded thereon duplication history information generated according to the instruction of the history generation instructing unit, and wherein the controller deletes the duplication history information when a further instruction is given by the history generation instructing unit.

4. The recording apparatus according to claim 1, wherein the controller performs control so that the recording medium is identified as a drive of the external apparatus according to the instruction of the instruction unit.

5. A recording apparatus capable of recording audio-video data files, comprising:

a first access unit that accesses a first recording medium having recorded thereon audio-video data file and history information indicating whether the audio-video data file is duplicated;

a second access unit that accesses a second recording medium;

an instruction unit that instructs duplication;

a controller that, according to the instruction of the instruction unit, controls the first access unit and the second access unit so that an unduplicated audio-video data file of the audio-video data file that is indicated by the history information is read from the first recording medium and is recorded onto the second recording medium and generates history information indicating that the audio-video data file read from the first recording medium is duplicated; and a history generation instructing unit that instructs generation of history information, wherein the controller, according to an instruction of the history generation instructing unit, generates history information indicating that the unduplicated audio-video data file of the audio-video data file is duplicated, without reading unduplicated audio-video data file of the audio-video data file from the first recording medium and recording it onto the second recording medium, wherein the instruction unit and the history generation instructing unit are integrated into a single operation member, wherein the single operation member operates as the instruction unit when the single operation member is operated in a state where the recording apparatus is connected to the external apparatus, and wherein the single operation member operates as the history generation instructing unit when the single operation member is operated in a state where the recording apparatus is not connected to the external apparatus.

6. The recording apparatus according to claim 5, further comprising a notifying unit that provides notification that history information has been generated according to the instruction of the history generation instructing unit.

7. The recording apparatus according to claim 5, wherein the first recording medium has further recorded thereon duplication history information generated according to the instruction of the history generation instructing unit, and wherein the controller deletes the duplication history information when a further instruction is given by the history generation instructing unit.

* * * * *